(12) United States Patent
Xu et al.

(10) Patent No.: US 9,251,417 B1
(45) Date of Patent: Feb. 2, 2016

(54) FAST OPEN DOORWAY DETECTION FOR AUTONOMOUS ROBOT EXPLORATION

(71) Applicant: HRL Laboratories, LLC, Malibu, CA (US)

(72) Inventors: Jiejun Xu, Chino, CA (US); Deepak Khosla, Camarillo, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/515,414

(22) Filed: Oct. 15, 2014

(51) Int. Cl.
*G06K 9/00* (2006.01)
*G06T 3/40* (2006.01)
*G06K 9/46* (2006.01)

(52) U.S. Cl.
CPC .......... *G06K 9/00624* (2013.01); *G06K 9/4604* (2013.01); *G06T 3/4023* (2013.01); *G06T 2210/21* (2013.01)

(58) Field of Classification Search
None
See application file for complete search history.

(56) References Cited

U.S. PATENT DOCUMENTS

| 8,488,877 B1 * | 7/2013 | Owechko | G06K 9/00704 382/103 |
| 8,948,501 B1 * | 2/2015 | Kim | G01S 7/4808 345/419 |

OTHER PUBLICATIONS

Schindler, F.; Worstner, W.; Frahm, J.-M., "Classification and reconstruction of surfaces from point clouds of man-made objects," in Computer Vision Workshops (ICCV Workshops), 2011 IEEE International Conference on , vol., no., pp. 257-263, Nov. 6-13, 2011, doi: 10.1109/ICCVW.2011.6130251, URL: http://ieeexplore.ieee.org/stamp/stamp.jsp?tp=&arnumber=.*

Korchev, Dmitriy, et al. "On Real-Time LIDAR Data Segmentation and Classification." Proceedings of the International Conference on Image Processing, Computer Vision, and Pattern Recognition (IPCV). The Steering Committee of The World Congress in Computer Science, Computer Engineering and Applied Computing (WorldComp), 2013.*

Kyungnam Kim; Cao, M.; Rao, S.; Jiejun Xu; Medasani, S.; Owechko, Y., "Multi-object detection and behavior recognition from motion 3D data," in Computer Vision and Pattern Recognition Workshops (CVPRW), 2011 IEEE Computer Society Conference on , vol., no., pp. 37-42, Jun. 20-25, 2011doi: 10.1109/CVPRW.2011.5981808URL: http://ieeexplore.ieee.org/stamp.*

Vosselman, George, and Sander Dijkman. "3D building model reconstruction from point clouds and ground plans." International Archives of Photogrammetry Remote Sensing and Spatial Information Sciences 34.3/W4 (2001): 37-44.*

Sven Lange, Niko Sunderhauf, Peer Neubert, Sebastian Drews, Peter Protzel, "Autonomous Corridor Flight of a UAV Using a Low-Cost and Light-Weight RGB-D Camera", Advances in Autonomous Mini Robots, 2012, pp. 183-192.

(Continued)

*Primary Examiner* — Tahmina Ansari
(74) *Attorney, Agent, or Firm* — Tope-McKay & Associates (57) ABSTRACT

Described is a system for open doorway detection for autonomous robot exploration, the system includes an onboard range sensor that is operable for constructing a three-dimensional (3D) point cloud of a scene. One or more processors that receive the 3D point cloud from the range sensor. The 3D point cloud is then filtered and downsampled to remove cloud points outside of a predefined range and reduce a size of the point cloud and, in doing so, generate a filtered and downsampled 3D point cloud. Vertical planes are extracted from the filtered and downsampled 3D point cloud. Finally, open doorways are identified from each extracted vertical plane.

12 Claims, 7 Drawing Sheets

(56) References Cited

OTHER PUBLICATIONS

Allen Ferrick, Jesse Fish, Edward Venator, Gregory S. Lee, "UAV Obstacle Avoidance Using Image Processing Techniques", IEEE International Conference on Technologies for Practical Robot Applications, (TePRA), 2012, pp. 73-78.

Matthew Derry, Brenna Argall, "Automated Doorway Detection for Assistive Shared-Control Wheelchairs", IEEE International Conference on Robotics and Automation (ICRA), 2013, pp. 1254-1259.

A.C. Murillo, J.Kosecka, J.J. Guerrero, C. Sagues, "Visual Door Detection Integrating Appearance and Shape Cues", Journal of Robotics and Autonomous Systems, 2008, vol. 56, Issue 6, Jun. 30, 2008, pp. 512-521.

Zhichao Chen, Stanley Birchfield, "Visual Detection of Lintel-Occluded Doors from a single image", IEEE Computer Society Conference on Computer Vision and Pattern Recognition Workshops, 2008. CVPRW, pp. 1-8.

Yingli Tian, Xiaodong Yang, Aries Arditi, "ComputerVision-based Door Detection for Accessibility of Unfamiliar Environments to Blind Persons", 12th International Conference, ICCHP 2010, Vienna, Austria, Jul. 14-16, 2010, Proceedings, Part II, pp. 263-270.

Point Cloud Library, http://www.pointclouds.org/documentation/tutorials/planar_segmentation.php taken 2014.

Point-line distance, http://mathworld.wolfram.com/Point-LineDistance3-Dimensional.html taken 2014.

ROS Fuerte Turtle http://ros.org/wiki/fuerte taken 2014.

Gazebo http://gazebosim.org/ taken 2014.

Shaojie Shen, Nathan Michael, Vijay Kumar, "Autonomous Multi-Floor Indoor Navigation with a Computationally Constrained MAV", 2011 IEEE International Conference on Robotics and Automation, May 9-13, 2011, Shanghai, China, pp. 20-25.

Simon Zigg, Davide Scaramuzza, Stephan Weiss, Roland Siegwart, "MAV Navigation through Indoor Corridors Using Optical Flow", IEEE International Conference on Robotics and Automation, ICRA 2010, pp. 1-8.

Stephane Ross et al., "Learning Monocular Reactive UAV Control in Cluttered Natural Environments", CoRR abs/1211.1690, (2012).

Martin A. Fischler, Robert C. Bolles, "Random sample consensus: a paradigm for model fitting with applications to image analysis and automated cartography", CACM, 24(6), Communications of the ACM CACM, vol. 24 Issue 6, Jun. 198, pp. 381-395.

J. Biswas and M. M. Veloso, "Depth camera based localization and navigation for indoor mobile robots," in RGB-D Workshop in Robotics: Science and Systems (RSS), 2011.

* cited by examiner

|  | Precision | Recall |
|---|---|---|
| Single wall single door | 100% | 100% |
| Single wall multiple doors | 100% | 100% |
| Multiple walls multiple doors | 100% | 94% |

700

|  | Precision | Recall |
|---|---|---|
| Single wall single door | 80% | 100% |
| Single wall multiple doors | N/A | N/A |
| Multiple walls multiple doors | 88% | 88% |

FAST OPEN DOORWAY DETECTION FOR AUTONOMOUS ROBOT EXPLORATION

GOVERNMENT RIGHTS

This invention was made with government support under the U.S. Government's CT2WS contract, Contract Number W31P4Q-08-C-0264. The government has certain rights in the invention.

BACKGROUND OF THE INVENTION (1) Field of the Invention

The present invention relates to a navigation system and, more particularly, to a system for detecting the location and orientation of open doorways for autonomous robot exploration.

(2) Discussion of Related Art

Exploration is a fundamental problem for autonomous mobile robots operating in unknown or dynamic environments. Exploration is related to the well-known problem of path planning. However, unlike the original problem, where complete knowledge of the environment is given, exploring an unknown environment is usually performed in a step-by-step greedy fashion. Instead of planning in advance the entire trajectory of the mobile robot, a greedy exploration strategy only plans one step (or a few steps) ahead based on the information about the environment acquired by the sensor(s) mounted on the robot. Determining where the robot moves next can be a problematic task.

Over the last decade, a developmental shift has occurred from ground-based robot platforms to mobile aerial robots (e.g., UAV), as the latter provides more agility and speed. While outdoors, UAVs can easily navigate the airspace. However, navigating indoors requires development of a system for small UAVs to navigate in indoor environments (e.g., corridor, warehouses). In such settings, the next candidate positions to explore typically refer to where the open spaces (e.g., open doors) are. Thus, the problem is then reduced to finding open doorways in such an environment.

Many visual doorway detection algorithms have been proposed in the past, as it is of great importance for both navigation and manipulation tasks. Most of the earlier works focused on extracting two-dimensional (2D) appearance and shape features to recognize doors. For example, A. C. Murillo, J. Kosecka, J. J. Guerrero, and C. Sagues, in "Visual Door Detection Integrating Appearance and Shape Cues", Journal of Robotics and Autonomous Systems, 2008, proposed a probabilistic approach by defining the likelihood of generating the door configurations with various features. In other work, Zhichao Chen and Stanley Birchfield, in "Visual Detection of Lintel-Occluded Doors from a single image, Workshop on Visual Localization from Mobile Platforms, CVPR 2008, proposed a Adaboost based approach along with two geometric features, concavity and bottom-edge intensity, to model the door explicitly. In yet other work, Yingli Tian, Xiaodong Yang, and Aries Arditi, in "ComputerVision-based Door Detection for Accessibility of Unfamiliar Environments to Blind Persons," ICCHP (2) 2010, further proposed a more generic geometric based approach to detect doors based on stable features such as edges and corners. However, as in most 2D vision algorithms, these works are sensitive to common factors such as illumination changes, occlusion, clutter, and perspective distortion.

As noted above, many approaches toward indoor robot navigation and exploration have been developed in the past. One of the major categories among these approaches focus on addressing the SLAM (Simultaneous Localization and Mapping) problem, where the goal is to integrate the information collected during navigation into an accurate map possible. In other words, SLAM aims to localize the robot and reconstruct the map from its trajectory. Many recent works in this category has started to utilize 3D range sensor in conjunction with point cloud alignment mechanisms for autonomous UAV navigation. An example of such work is that by Shaojie Shen, Nathan Michael, and Vijay Kumar, in "Autonomous Multi-Floor Indoor Navigation with a Computationally Constrained MAV", ICRA 2011. However, this line of work does not address the important question of where the robot should go next.

Another related area falls into obstacle avoidance. Due to the growing interests in smaller UAV flying in indoor and other GPS denied environments, quite a few research works have been developed to utilize onboard visual sensors to ensure safe maneuver in such conditions. Techniques focusing on monocular sensors have long been the main studied area. This includes the optical flow based approach by Zigg et al. (i.e., Simon Zigg, Davide Scaramuzza, Stephan Weiss, Roland Siegwart, "MAV Navigation through Indoor Corridors Using Optical Flow", ICRA 2010) and the imitation learning based approach by Ross (i.e., Stephane Ross et al., "Learning Monocular Reactive UAV Control in Cluttered Natural Environments", CoRR abs/1211.1690, 2012). Similar to the SLAM community, researchers also started to investigate the areas of utilizing Lidar or other RGB-D sensors for obstacle avoidance (e.g., Allen Ferrick, Jesse Fish, Edward Venator, Gregory S. Lee, "UAV Obstacle Avoidance Using image Processing Techniques", Technologies for Practical Robot Applications, 2012). However, regardless of monocular vision or 3D vision, a common theme across most works on obstacle avoidance is the reactive action control for UAVs. This means that the control system will react and prevent the UAV from colliding with an obstacle when it is close by. However, it does not plan ahead for opportunity spaces which are further away to be explored.

In Lange's work (i.e., Sven Lange, Niko Sunderhauf Peer Neubert, Sebastian Drews, Peter Protzel, "Autonomous Corridor Flight of a UAV Using a Low-Cost and Light-Weight RGB-D Camera", Advances in Autonomous Mini Robots, 2012), a 3D algorithm is proposed to process a point cloud captured by a Kinect sensor mounted on a UAV. The UAV is assumed to navigate and explore in an indoor corridor environment. The algorithm simply detects 4 major planes from the point cloud: two walls, a ground and a ceiling. Then, the distances between the UAV and each of the four planes are computed. Subsequently, the position of the UAV is adjusted and maintained in the center of the four planes. This implementation is very straight forward in a corridor setting. While the system of Lange allows the UAV to move in straight line, it does not extend beyond that in that it does not identify the exact location and orientation of open doors which are suitable for navigation.

Another related work is that of Derry et al. (i.e., Matthew Derry, Brenna Argall, "Automated Doorway Detection for Assistive Shared-Control Wheelchairs", ICRA 2013), in which a 3D based algorithm is proposed to detect doors for assistive wheelchairs. The work of Lange is not appropriate for a UAV in that it operates on a ground plane and also imposes strong assumptions on the geometry of the point cloud (e.g., the input point cloud contains mostly front facing walls, the viewing angle between the sensor and a wall is unchanged in y-axis etc.).

Thus, a continuing need exists for a system that provides fast and efficient detection of open doorways using only 3D point cloud data and, in doing so, provides detection of the location and orientation of doorways through which an autonomous UAV can navigate.

SUMMARY OF INVENTION

Described is a system for open doorway detection for autonomous robot exploration. The system includes an onboard range sensor, the range sensor operable for constructing a three-dimensional (3D) point cloud of a scene. The system also includes one or more processors and a memory, the memory being a non-transitory computer-readable medium having executable instructions encoded thereon, such that upon execution of the instructions, the one or more processors perform multiple operations. For example, the system receives a 3D point cloud from the range sensor, the 3D point cloud having a plurality of cloud points. The 3D point cloud is filtered and downsamples to remove cloud points outside of a predefined range and reduce a size of the point cloud and, in doing so, generating a filtered and downsampled 3D point cloud. Vertical planes are extracted from the filtered and downsampled 3D point cloud. Thereafter, open doorways are identified from each extracted vertical plane.

In another aspect, in downsampling the 3D point cloud, a 3D voxel grid is positioned over the input point cloud data, with all points present in each voxel being approximated by a centroid of the voxel.

Further, extracting vertical planes from the filtered and downsampled 3D point cloud further comprises operations of detecting planes in the filtered and downsampled 3D point cloud; and identifying, amongst the detected planes, planes that are vertical to a ground surface as extracted vertical planes, each extracted vertical plane having a height.

In another aspect, identifying open doorways from each extracted vertical plane further comprises operations of scanning horizontally along a stripe of the extracted vertical plane to identify one or more gaps within a predefined doorway dimension range; and determining a number of cloud points within a space bounded by each gap location, the height of the extracted vertical plane, and the ground surface, such that if the number of cloud points with the space is less than a predetermined threshold, the gap is designated as an open doorway.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a navigation system and, more particularly, to a system for detecting the location and orientation of open doorways for autonomous robot exploration. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is an open doorway detection system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
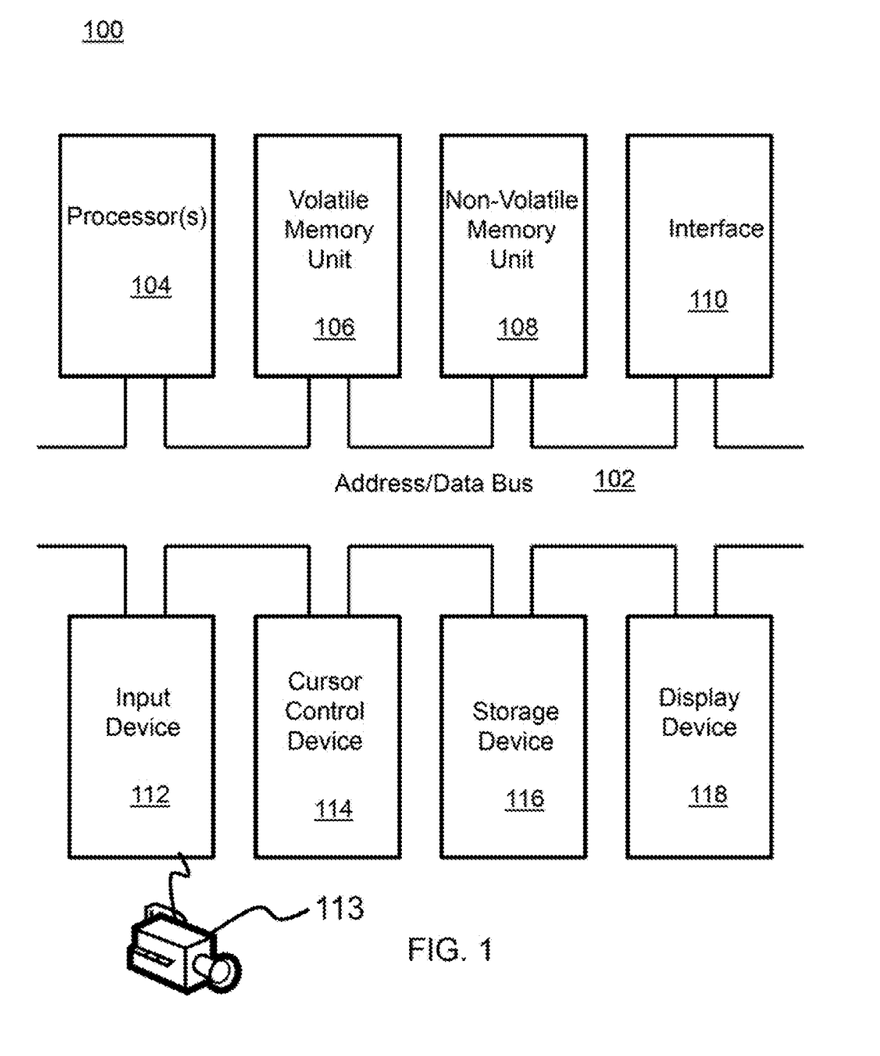
FIG. 1 is a block diagram depicting the components of an open doorway detection system according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device (or in addition to or any combination thereof), such as a three-dimensional (3D) range sensor 113 or any other sensor or device that is operable for sensing the environment and/or obtaining and providing information as may be required to perform the operations described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
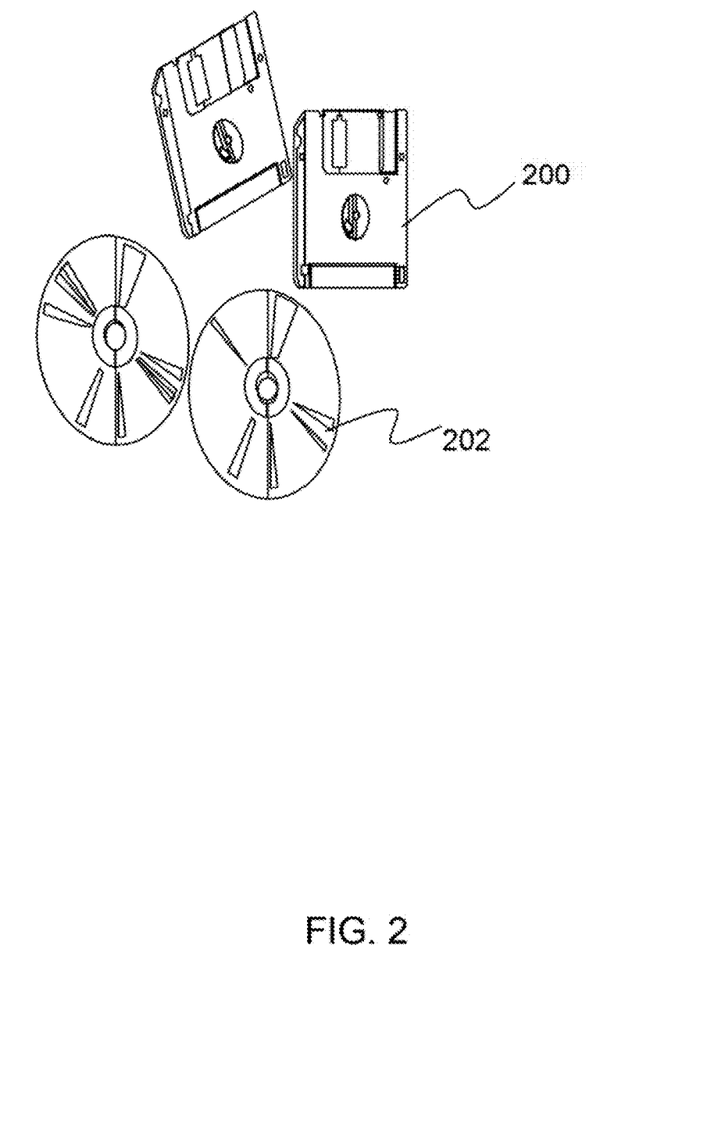
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

The ability to explore unknown places is an essential component for an autonomous system, such as an unmanned aerial vehicle (UAV). The basic problem is the following: after being deployed into an unknown environment, a robot must perform sensing operations continuously to decide the next exploration location, and possibly maintain an internal representation of the environment. A well-studied and related problem is the Simultaneous Localization and Mapping (SLAM) problem, where the goal is to integrate the information collected during navigation into an accurate map as possible. However, SLAM does not address the question of where the robot should go next. Thus, the present invention addresses the task of identifying where the autonomous system should go next. Specifically, described is a system that is designed for an indoor environment (although not limited thereto) such as corridors or warehouses. In such a setting, the next "good" candidate positions to explore typically refer to where the open spaces (e.g., open doors) are. To this end, described is a robust and efficient system to identify open doorways for indoor UAV exploration using relevant data, such as three-dimensional (3D) range data.

Described is a real-time system for rapid detection of open doorways for autonomous robot exploration. Although this specification references the indoor (e.g., corridors, warehouses) navigation problem for a small UAV, it should be understood that the invention is applicable to any mobile robot or platform (air, land, and water) in different environmental settings and can be incorporated onboard the mobile robot or platform. As one non-limiting example, a 3D range sensor is mounted on a UAV, and it continues to scan and acquire signal from its surroundings as the UAV navigates in an unknown environment. From each scan, a 3D point cloud is obtained. The system identifies all vertical planes and subsequently detects any open spaces within the planes using robust geometric estimation and statistical methods. Note that the approach builds on a 3D perception pipeline solely from the sensed range data of each scan, without any a priori model learning. The system is validated with both real world and simulated data for the open doorway detection tasks. The robustness of the approach is clearly demonstrated by the experimental results. Further details are provided below.

(3) Specific Details of the Invention

Figure 3:
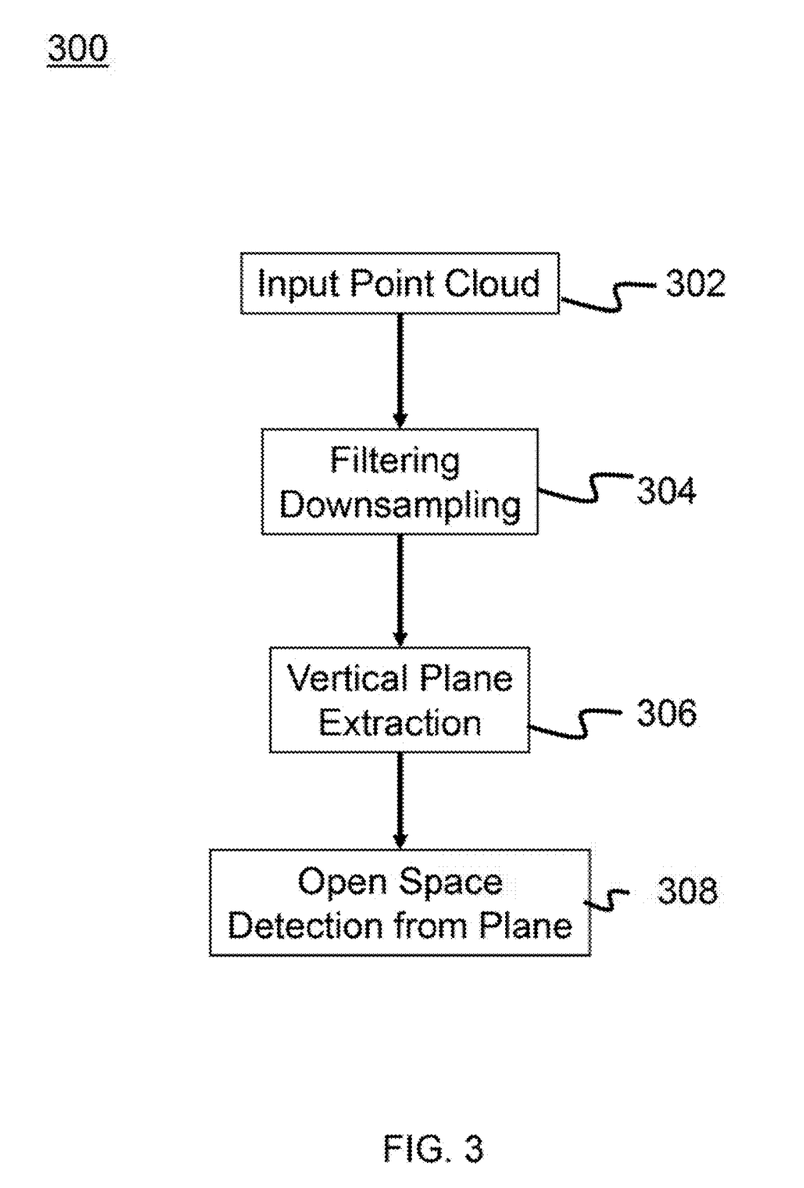
FIG. 3 is a block diagram of rapid open doorway detection.

FIG. 3 provides a flowchart 300 illustrating the process flow for the real-time open doorway detection system. First, a point cloud 302 is generated with onboard range sensor at a particular location (e.g., as the UAV navigates through the corridor). As a non-limiting example and in one implementation, a Microsoft Kinect sensor can operate as the range sensor to capture the point cloud 302. In this example, the Microsoft Kinect sensor includes two cameras and an infrared laser light source. The IR source projects a pattern of dark and bright spots onto the environment. This pattern is then received by one of the two cameras which are designed to be sensitive to IR light. Depth measurements can be obtained from the IR pattern by triangulation. Subsequently, a point cloud is constructed internally in the sensor and can be requested by the algorithm directly. Note that the returned point cloud is in real world scale, and can be described in the common metric system. Given the 3D point cloud 302, a three-stage processing pipeline follows: 1) Filter and Downsampling 304, in which the point cloud 302 is filtered and downsampled to reduce computational load for real time application, 2) Vertical Plane Extraction 306, in which the system extracts vertical planes in order to limit the search space for candidate doorways; 3) Open Doorway Detection from Vertical Planes 308, in which the system identifies open doorways from each extracted vertical plane. Each of these aspects is described in further detail below.

(3.1) Filtering and Downsampling of Point Cloud 3D range sensor typically generate voluminous data that cannot be processed in its entirety for many real time applications. Thus, the first step of the system is to reduce the number of points in the point cloud by filtering and downsampling in exchange for a more efficient computation. Filtering includes removing points which lie outside of a specific range. Any suitable filtering technique can be used. As a non-limiting example, a Kinect sensor has an effective range of 6 meters. Thus, in this example, the system removes all points which are greater than 6 meters away with respect to the sensor in the Z-axis.

In terms of downsampling the point cloud, a typical voxelized grid approach is taken. Basically, a 3D voxel grid (e.g., a voxel grid is a set of fixed width 3D boxes in space) is positioned over the input point cloud data. Then, in each voxel (i.e., 3D box), all the points present will be approximated (i.e., downsampled) with their centroid. Although this approach is a little slower than approximating them with the center of the voxel, it represents the underlying surface more accurately.

Figure 4:
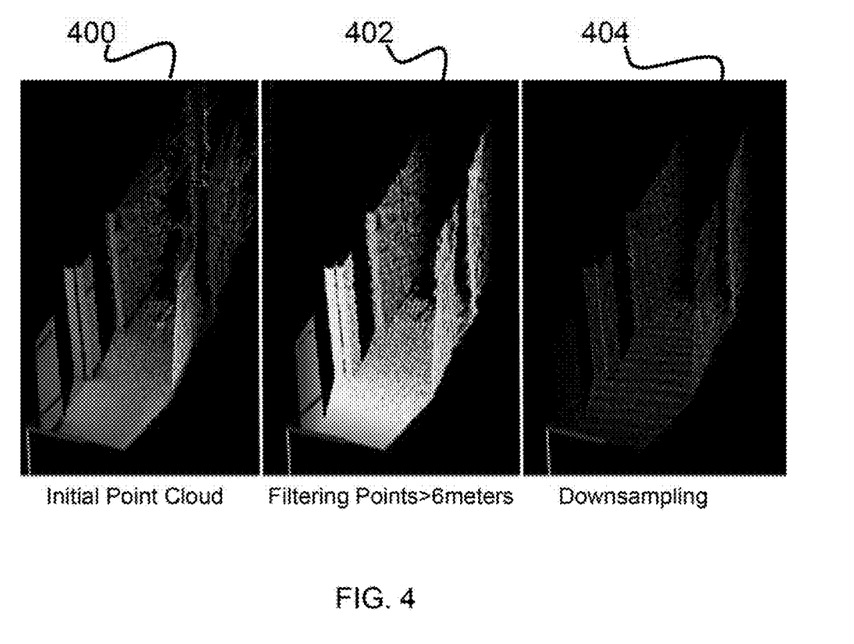
FIG. 4 is an illustration depicting an example of filtering and downsampling a point cloud.

The 3D voxel grid can be created efficiently with a hierarchical Octree data structure. Each Octree node has either eight children or no children. The root node describes a cubic bounding box which encapsulates all points. At every tree level, this space is further subdivided by a fixed factor, which results in an increased voxel resolution. An example of a voxel grid implementation is that as described in the Point Cloud Library (PCL) 1.6.0, found at pointclouds.org/documentation/tutorials/planar segmentation.php, which is hereby incorporated by reference as though fully set forth herein. In this non-limiting example, the size of each voxel (i.e., 3D box) is fixed at 0.05 meter. FIG. 4 shows the results of filtering 402 and downsampling 404 of a sample point cloud 400 captured in an indoor hall corridor. In this example, the original point cloud 400 is captured by a Kinect sensor. The filtering process results in the filtered point cloud 402 to filter out points over 6 meters away from the sensor. Finally, the downsampled point cloud 404 is reduced in size (e.g., approximately 30 times) so that it is much more sparse than the original point cloud 400.

As illustrated, a large portion of the points are removed by the end of this process. The overall process of distance filtering and voxel grid downsampling is conducted very efficiently. The processing time for each system components is reported in the experiment section.

(3.2) Vertical Plane Extraction

In the context of the present invention, it is desirable to identify vertical planes (e.g., walls) which reside on top of the ground surface. The ground surface is important as it serves as the key reference for geometrical estimates. The walls are the candidate search space for open doors in the context of our application. This step is essentially fitting a plane model to the point cloud and finding the ones with sufficient number of points. To speed up the search process, a Random Sample Consensus (RANSAC) algorithm is used to generate model hypotheses. The RANSAC algorithm was described by M. Fischler and R. Bolles, in "Random sample consensus: A paradigm for model fitting with applications to image analysis and automated cartography," CACM, 24(6), 1981, which is hereby incorporated by reference as though fully set forth herein.

The plane detection process mainly involves the following steps:

1. Randomly select three non-collinear unique points from the point cloud P;
2. Compute the plane model coefficients from the three points using equation ax+by+cz+d=0;
3. Compute the distances from all point belongs to the cloud P to the plane model (a, b, c, d); and
4. Count the number of points p* that belong to P whose distance to the plane model falls between a pre-defined threshold (e.g., in one example, the threshold value is fixed at 0.1 meter).

The fourth step represents one of the many ways of "scoring" a specific model. Every set of points p* is stored, and the above steps are repeated for a pre-defined number of iterations which is estimated within RANSAC. An example of RANSAC was described by Martin A. Fischler and Robert C. Bolles, in "Random sample consensus: a paradigm for model fitting with applications to image analysis and automated cartography", Communications, ACM, 1981, which is hereby incorporated by reference as though fully set forth herein. Once the algorithm is terminated, the set with the largest number of points (inliers) is selected as the support for the best planar model found. Those points are archived and removed from the original point cloud, and the remaining part will be returned to the above algorithm again to identify the next best plane. This process continues to detect planes and remove points until the original point cloud is exhausted. Note that, for each detected plane, an additional step is taken to project all inlier points to the plane such that all lie in a perfect plane model. This makes subsequent computation much more efficient and less error prone.

Given all the extracted planes, the next step is to identify the ones which are vertical to the ground surface. Recall that the normal of a plane can be computed using the planar model coefficient directly. Assume two plane normals no and $n_1$ as follow:

$$n_0 = <a_0, b_0, c_0>$$

$$n_1 = <a_1, b_1, c_1>$$

The angle θ between two planes is related to the normals of the planes as follows:

$$n_0 \cdot n_1 = \|n_0\| \|n_1\| \cos \theta$$

The above equation can be further rewritten as:

$$<a_0, b_0, c_0> \cdot <a_1, b_1, c_1> = \sqrt{a_0^2 + b_0^2 + c_0^2} \sqrt{a_1^2 + b_1^2 + c_1^2} \cos\theta$$

Thus, given the ground surface with normal $n_0 = <0, 1, 0>$, the angle between a plane ($n_1 = <a_1, b_1, c_1>$) to the ground surface is computed as:

$$\theta = \arccos\left(\frac{b_1}{\sqrt{a_1^2 + b_1^2 + c_1^2}}\right) \cdot 180/\pi.$$

Figure 5:
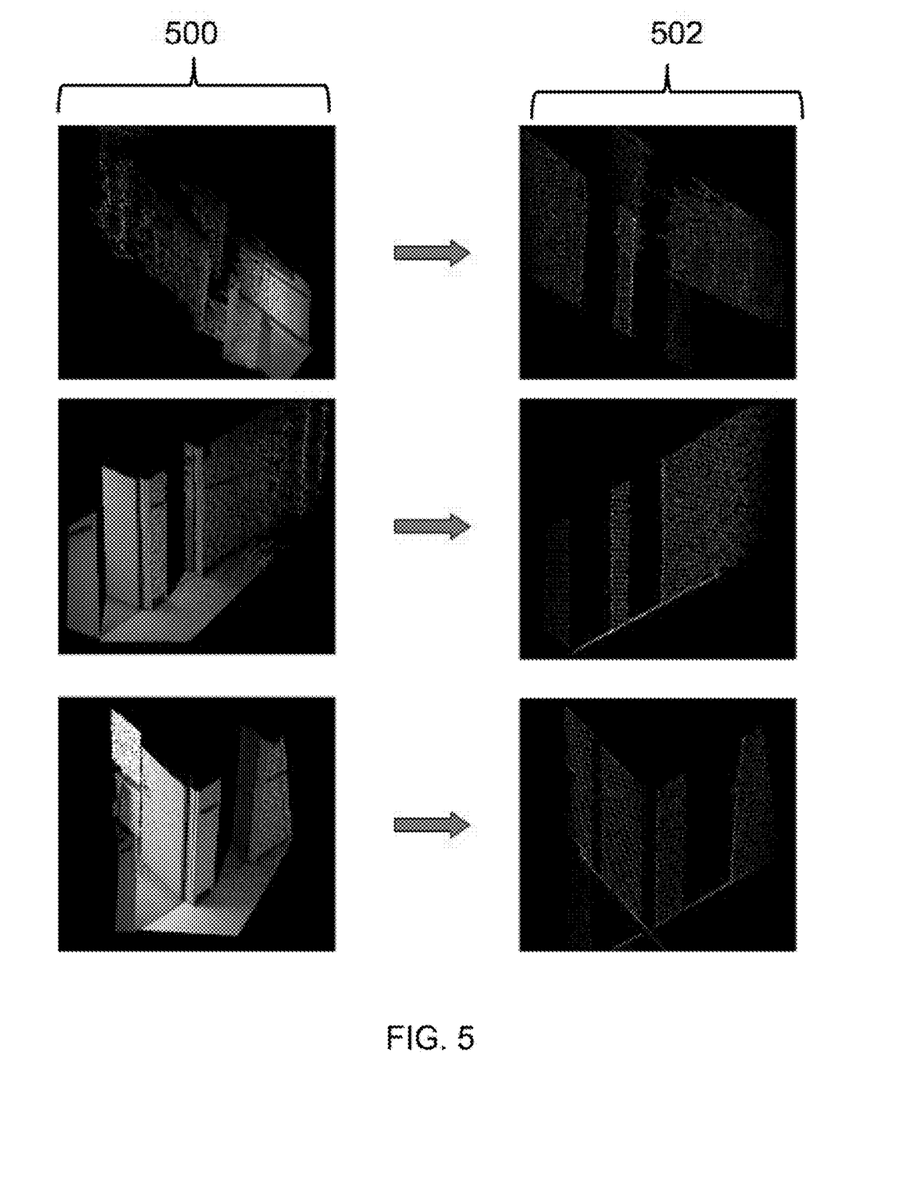
FIG. 5 is an illustration depicting examples of vertical planes extraction.

It should be noted that the angles used herein assumes a coordinate system. Specifically, any suitable coordinate system can be used according to the principles of the present invention. As a non-limiting example, the coordinate system assume the sensor as the origin. The X-axes corresponds to the left-right, the Y-axes corresponds to the up-down, and the Z-axes corresponds to the line perpendicular to the XY plane (away from the sensor). Thus, the ground plane can be identified by computing the angles between all planes with respect to no and keeping the one pair which are in parallel. If more than one pair is found, the lower plane will be kept. In the process described here, the system allows for a +−15 degree (or other suitable variation) to compensate possible sensor orientation movements. Similarly, walls can be determined by keeping planes which are vertical to the identified ground surface. They will be passed to the next step of the system for open space (doorway) extraction. Naturally this plane extraction approach will apply to ground-based robot as well. Examples of extracted vertical planes are shown in FIG. 5. The left column 500 includes input color point clouds as obtained from a Kinect sensor, whereas the right column 502 illustrates the corresponding extracted vertical planes. Although not illustrated, color can be used to depict the range from the sensor.

(3.3) Open Doorway Detection from Vertical Planes (Walls)

Locations (boundaries) and orientations of the open spaces (e.g., doorways) are computed from the vertical planes. Such information is crucial for autonomous UAV navigation in the indoor environment. At a high level, the system scans horizontally along a stripe of the vertical plane (wall) for gaps which are within the dimension range of a doorway. When a gap of the appropriate width is identified, a count is made of the number of points within a space bounded by the gap location, height of the vertical plane, and the ground surface. This constrained volume should contain very few points if it is an open doorway. In theory, it should actually contain zero points, but a small threshold is given to accommodate sensor noise. Once a doorway is detected, the system then provides 3D annotations of open doorway locations from the geometric information captured from the point cloud. The output of this process is the location of each identified open doorway with respect to the camera coordinate system, the normal vector indicating the orientation of the doorway, and its boundary. Thereafter and if desired, the UAV or other mobile platform can be directed to maneuver itself through open doorway.

The primary steps used for open doorway detection is as follows:

1. Compute the heights $h_1$ and $h_2$, on both sides of the vertical plane.
2. Determine the reference line which passes through the mid points at both sides of the plane (i.e., points at $h_1/2$ and $h_2/2$).
3. Construct a stripe of points based on the reference line, and then scan along the stripe for open gaps. The stripe consists of points which are nearby with respect to the reference line. A distance threshold (e.g., 0.2 meter, or any other desired distance) can be selected to define the nearby positions. However, desirably, the system first goes through each point in the point cloud and computes each point's distance to the reference line. The computation of the distance between a point and a line in 3D is as follows. Let l be a line in three dimensional space specified by two points $X_1=(x_1, y_1, z_1)$ and $X_2=(x_2, Y_2, z_2)$, and let $X_0=(x_0, y_0, z_0)$ be another point in the 3D space, the distance d between $X_0$ and the line l is defined as:

$$d = \frac{\|(X_0 - X_1) \times (X_0 - X_2)\|}{\|X_2 - X_1\|}.$$

Point line distance was described online at mathworld.wolfram.com/Point-LineDistance3-Dimensional.html, which is hereby incorporated by reference as though fully set forth herein.

Figure 6:
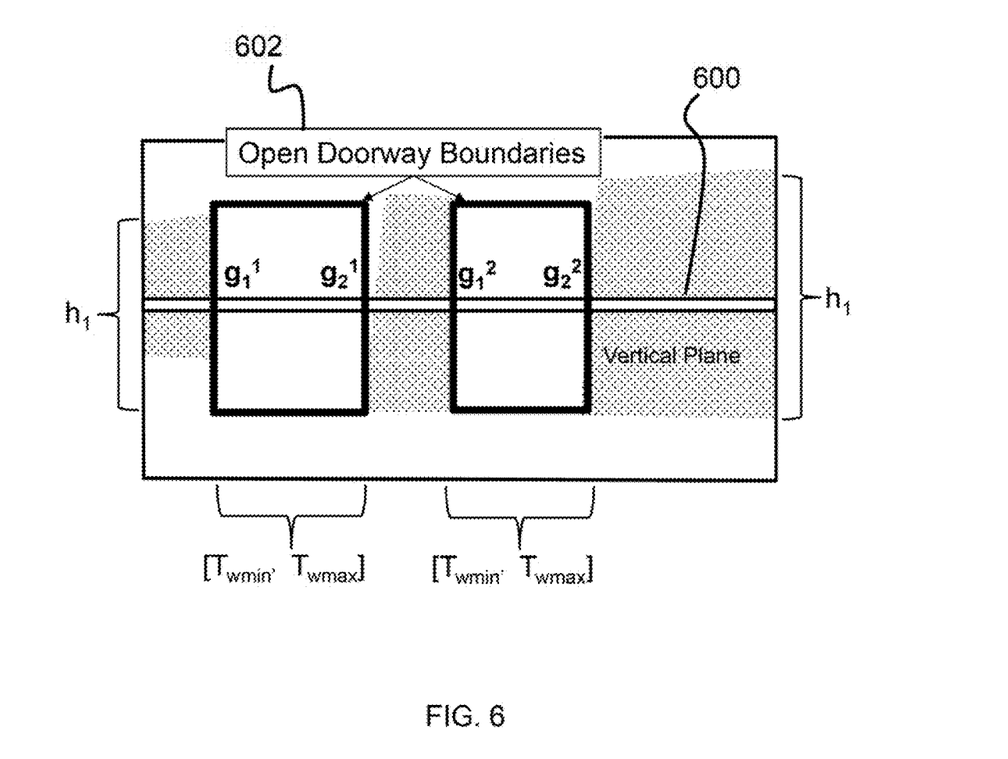
FIG. 6 is an illustration depicting the gap detection procedure.

Since the point cloud has been previously downsampled, the above operation is very fast. For a point whose distance to the reference line is less than or equal to the defined threshold, it would be included in the stripe. Once the stripe is constructed, the system computes the dominant direction of the stripe (either in X-axis or Z-axis), and then sorts all the points in the stripe according to the computed direction. After that, the system goes through all the points sequentially in the sorted order. All the gaps can be efficiently identified in just one round by simply checking the distances between each pairs of consecutive points. Whenever the distance between two consecutive points ($g_1$, $g_2$) falls within the pre-defined gap range (for example, between 0.5 and 1.5 meters, or any other desired gap range), a candidate open space is detected. This concept is further illustrated in FIG. 6, which depicts the procedure of stripe scanning for open gaps across walls. As shown in FIG. 6, the parameter $h_1$ and $h_2$ are the heights of the plane on both sides (i.e., the two edges of the vertical plane). The strip 600 lies in the middle of the plane, and is used for scanning open gaps. The rectangles 602 indicate detected open doorways from the next step.

4. Compute the boundary of an open space. In a common case, the left and right boundaries are the two vertical lines which pass through the two points $g_1$ and $g_2$ respectively, defining the gap as shown in the previous step. The bottom boundary is the ground surface, and the top boundary is a defined by a fixed height with respect to the ground surface. A final verification is conducted to check for any points within the boundary. An open doorway is detected if the boundary contains no point (or a very small number of points from sensor noise).

(4) Experimental Results

The present invention was reduced to practice to provide test results and verify operations. It should be understand that the specific implementation described below is provided as a non-limiting example and that the invention is not intended to be limited thereto. The open doorway process was implemented using a laptop PC with an Intel Core i7 having 8 GB of RAM, and running Ubuntu 12.04 ROS (Robot Operating System) Fuerte (see ros.org/wiki/fuerte), and PCL (Point Cloud Library) 1.6.0. Point clouds are captured by a Kinect sensor and streamed to the laptop for processing. The entire system can be ported for onboard processing on a UAV.

Figure 7:
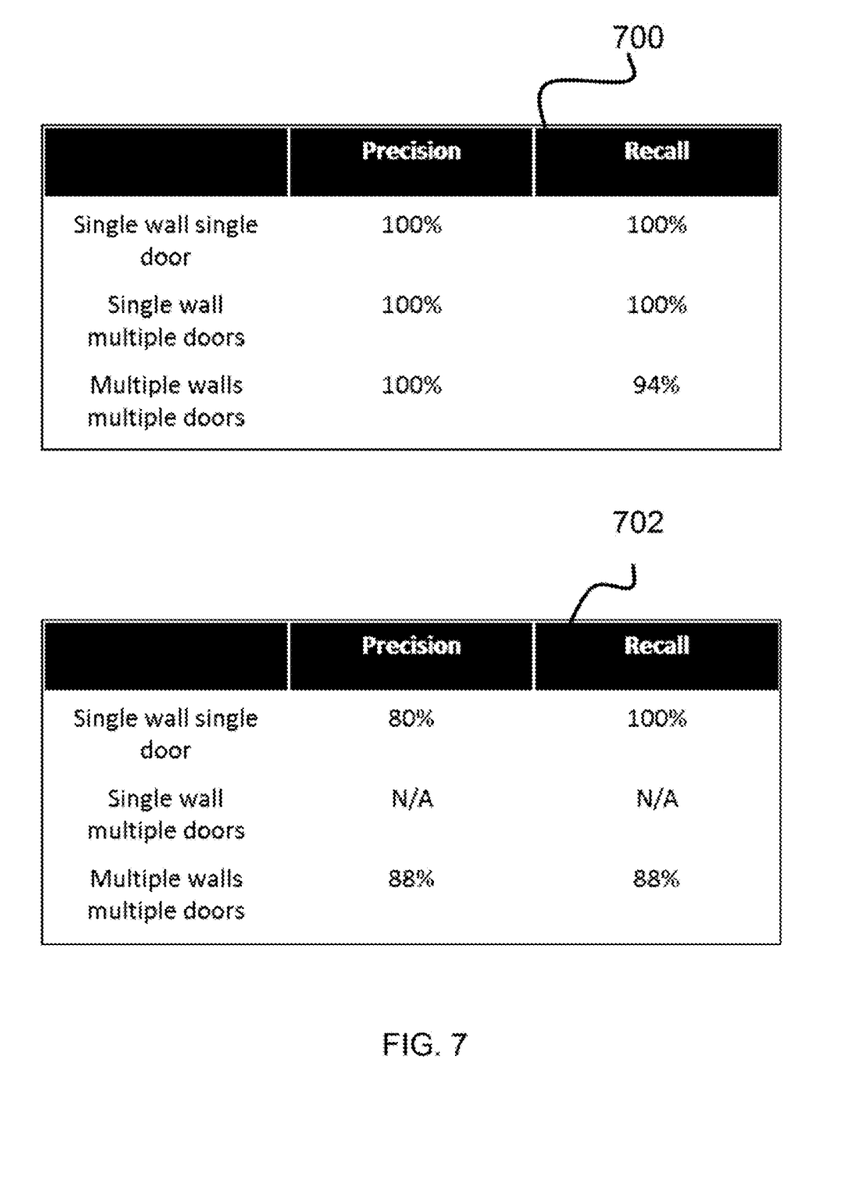
FIG. 7 depicts tables with quantitative results of open doorway detection on real world data and results of open doorway detection on simulated data.

The system was tested on both real world data captured in a corridor and simulated data of a 3D warehouse. The simulation was carried out within the Gazebo environment (see gazebosim.org/). The tables illustrated in FIG. 7 summarize the quantitative results of the system under different test scenarios from the input point cloud: single wall single door; single wall multiple doors, and multiple walls multiple doors. Five test cases were assigned to each test scenario on average. Specifically, the first table 700 illustrates quantitative results of the open doorway detection on real world data, and the second table 700 illustrates results of open doorway detection on simulated data.

In terms of efficiency, the average processing times for the three steps in the system were: A) 0.01 seconds for filtering and downsampling, B) 0.02 seconds for vertical plane extraction, and C) 0.02 seconds for open doorway detection from vertical planes. Overall, the open doorway detection system has demonstrated very satisfactory results on both efficiency and accuracy.

What is claimed is:

1. A system for open doorway detection for autonomous robot exploration, the system comprising:
an onboard range sensor, the range sensor operable for constructing a three-dimensional (3D) point cloud of a scene;
one or more processors and a memory, the memory being a non-transitory computer-readable medium having executable instructions encoded thereon, such that upon execution of the instructions, the one or more processors perform operations of:
receiving a 3D point cloud from the range sensor, the 3D point cloud having a plurality of cloud points;
filtering and downsampling the 3D point cloud to remove cloud points outside of a predefined range and reduce a size of the point cloud and, in doing so, generating a filtered and downsampled 3D point cloud;
extracting vertical planes from the filtered and downsampled 3D point cloud; and
identifying open doorways from each extracted vertical plane.

2. The system as set forth in claim 1, wherein in downsampling the 3D point cloud, a 3D voxel grid is positioned over the input point cloud data, with all points present in each voxel being approximated by a centroid of the voxel.

3. The system as set forth in claim 2, wherein extracting vertical planes from the filtered and downsampled 3D point cloud further comprises operations of:
detecting planes in the filtered and downsampled 3D point cloud; and
identifying, amongst the detected planes, planes that are vertical to a ground surface as extracted vertical planes, each extracted vertical plane having a height.

4. The system as set forth in claim 3, wherein identifying open doorways from each extracted vertical plane further comprises operations of:
scanning horizontally along a stripe of the extracted vertical plane to identify one or more gaps within a pre-defined doorway dimension range; and
determining a number of cloud points within a space bounded by each gap location, the height of the extracted vertical plane, and the ground surface, such that if the number of cloud points with the space is less than a predetermined threshold, the gap is designated as an open doorway.

5. A computer program product for open doorway detection for autonomous robot exploration, the computer program product comprising computer-readable instructions stored on a non-transitory computer-readable medium that are executable by a computer having one or more processors, such that upon execution of the instructions, the one or more processors perform operations of:

receiving a three-dimensional (3D) point cloud from an onboard range sensor, the 3D point cloud having a plurality of cloud points;

filtering and downsampling the 3D point cloud to remove cloud points outside of a predefined range and reduce a size of the point cloud and, in doing so, generating a filtered and downsampled 3D point cloud;

extracting vertical planes from the filtered and downsampled 3D point cloud; and identifying open doorways from each extracted vertical plane.

6. The computer program product as set forth in claim 5, wherein in downsampling the 3D point cloud, a 3D voxel grid is positioned over the input point cloud data, with all points present in each voxel being approximated by a centroid of the voxel.

7. The computer program product as set forth in claim 6, wherein extracting vertical planes from the filtered and downsampled 3D point cloud further comprises operations of:

detecting planes in the filtered and downsampled 3D point cloud; and identifying, amongst the detected planes, planes that are vertical to a ground surface as extracted vertical planes, each extracted vertical plane having a height.

8. The computer program product as set forth in claim 7, wherein identifying open doorways from each extracted vertical plane further comprises operations of:

scanning horizontally along a stripe of the extracted vertical plane to identify one or more gaps within a predefined doorway dimension range; and determining a number of cloud points within a space bounded by each gap location, the height of the extracted vertical plane, and the ground surface, such that if the number of cloud points with the space is less than a predetermined threshold, the gap is designated as an open doorway.

9. A method for open doorway detection for autonomous robot exploration, the method comprising an act of:

executing computer-readable instructions stored on a non-transitory computer-readable medium, such that upon execution of the instructions, one or more processors perform operations of:

receiving a three-dimensional (3D) point cloud from an onboard range sensor, the 3D point cloud having a plurality of cloud points;

filtering and downsampling the 3D point cloud to remove cloud points outside of a predefined range and reduce a size of the point cloud and, in doing so, generating a filtered and downsampled 3D point cloud;

extracting vertical planes from the filtered and downsampled 3D point cloud; and identifying open doorways from each extracted vertical plane.

10. The method as set forth in claim 9, wherein in downsampling the 3D point cloud, a 3D voxel grid is positioned over the input point cloud data, with all points present in each voxel being approximated by a centroid of the voxel.

11. The method as set forth in claim 10, wherein extracting vertical planes from the filtered and downsampled 3D point cloud further comprises operations of:

detecting planes in the filtered and downsampled 3D point cloud; and identifying, amongst the detected planes, planes that are vertical to a ground surface as extracted vertical planes, each extracted vertical plane having a height.

12. The method as set forth in claim 11, wherein identifying open doorways from each extracted vertical plane further comprises operations of:

scanning horizontally along a stripe of the extracted vertical plane to identify one or more gaps within a predefined doorway dimension range; and determining a number of cloud points within a space bounded by each gap location, the height of the extracted vertical plane, and the ground surface, such that if the number of cloud points with the space is less than a predetermined threshold, the gap is designated as an open doorway.

* * * * *